United States Patent [19]

Herman

[11] 4,363,045
[45] Dec. 7, 1982

[54] MAGNETIC TRANSDUCER SUSPENSION DEVICE

[75] Inventor: Robert W. Herman, Laguna Beach, Calif.

[73] Assignee: New World Computer Company, Inc., Costa Mesa, Calif.

[21] Appl. No.: 199,092

[22] Filed: Oct. 20, 1980

[51] Int. Cl.³ .......................... G11B 5/48; G11B 5/54; G11B 5/60

[52] U.S. Cl. .................................. 360/104; 360/103; 360/105; 360/106

[58] Field of Search ............... 360/104, 103, 109, 102, 360/106, 105

[56] References Cited

U.S. PATENT DOCUMENTS

| | | | |
|---|---|---|---|
| 3,177,495 | 4/1965 | Felts | 346/74 |
| 3,512,253 | 5/1970 | Perkins et al. | 29/603 |
| 3,573,768 | 4/1971 | Harris | 340/174.1 |
| 3,665,434 | 5/1972 | Applequist | 360/103 |
| 3,702,461 | 11/1972 | Cantwell | 340/174.1 |
| 3,975,770 | 8/1976 | Spash et al. | 360/103 |
| 4,280,156 | 7/1981 | Villette | 360/103 |
| 4,286,297 | 8/1981 | Root et al. | 360/104 |

OTHER PUBLICATIONS

IBM Tech. Disc. Bull., R. B. Watrous, Adjustable Suspension Mount for Head Assembly.

*Primary Examiner*—Alfred H. Eddleman
*Attorney, Agent, or Firm*—Lyon & Lyon

[57] ABSTRACT

A suspension device for a magnetic transducer including a spring member and a transducer attachment clip engaged by the spring member. Pivot means are disposed between the spring member and the attachment clip to define an axis of rotation. The device may include a retraction member adapted to engage the attachment clip and indexing means between the retraction member and the attachment clip to index the attachment clip when the retraction member engages the clip. The spring member and the retraction member may be integrally formed.

11 Claims, 9 Drawing Figures

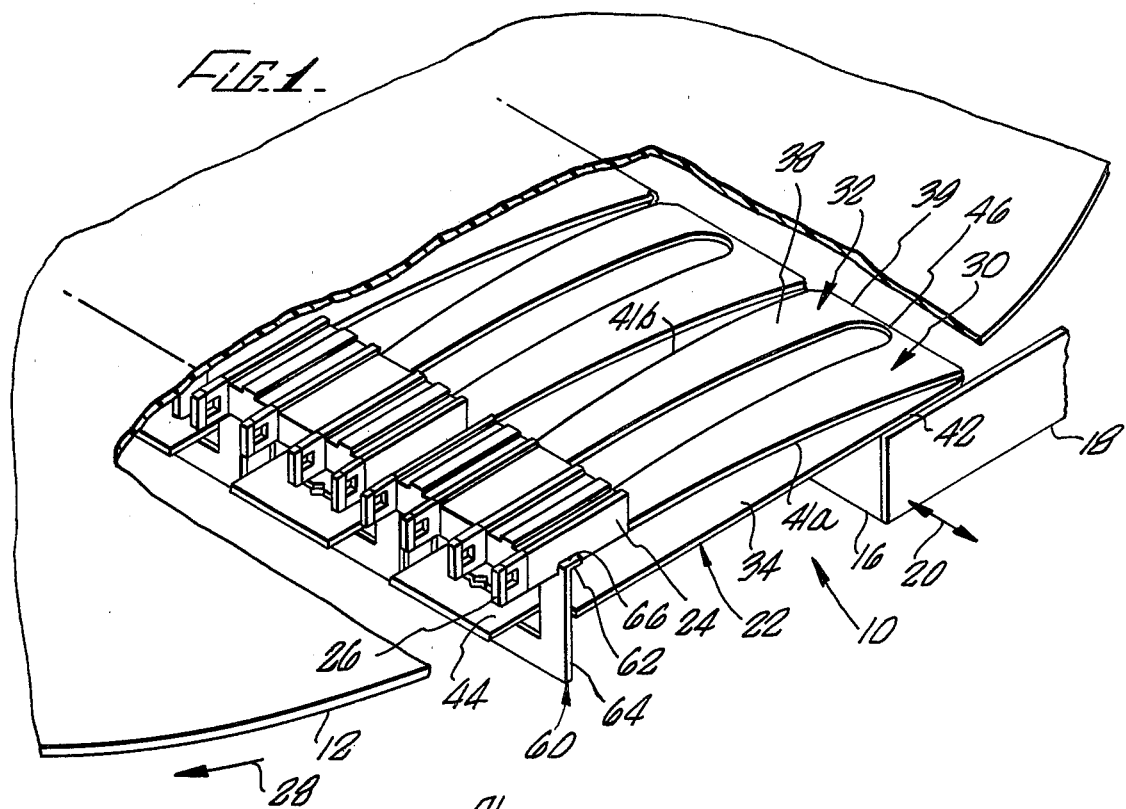
Fig. 1.
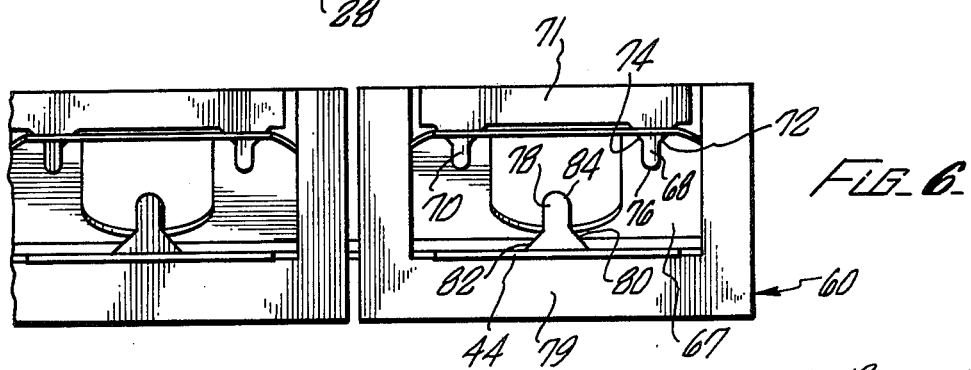
Fig. 6.
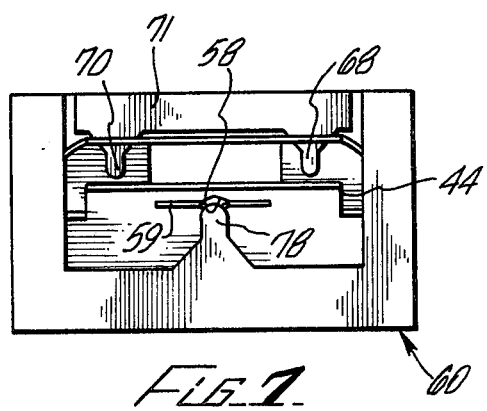
Fig. 7.
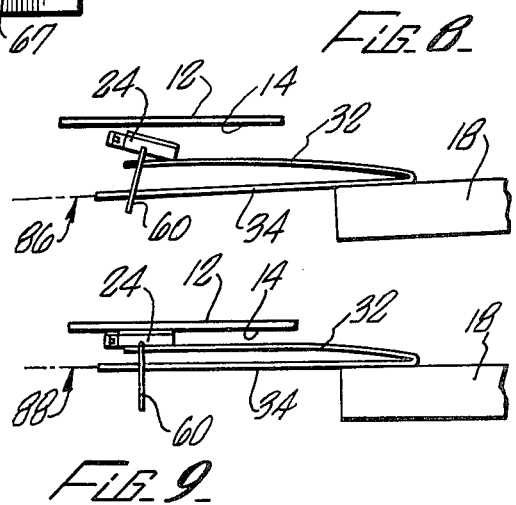
Fig. 8.
Fig. 9.

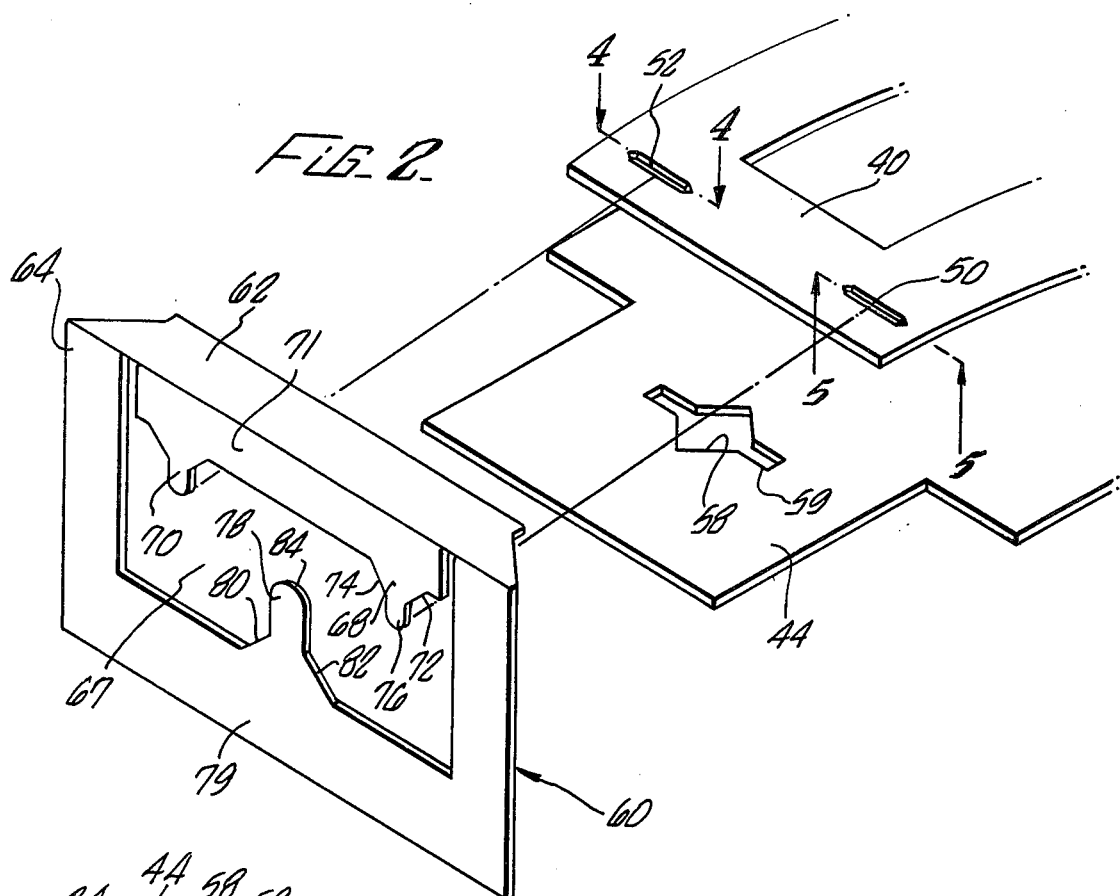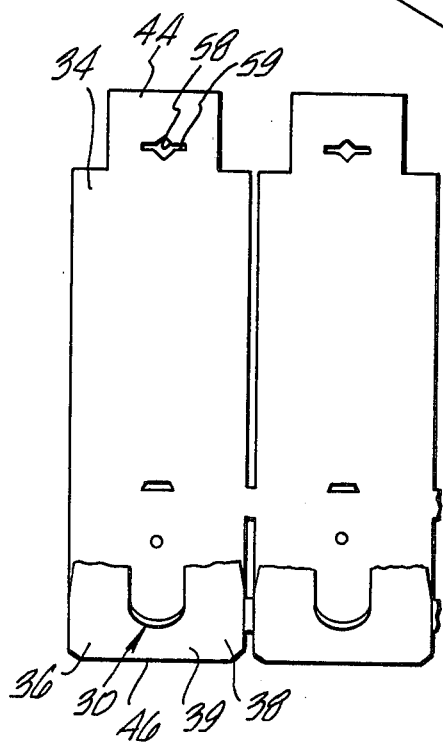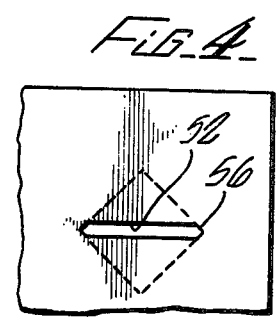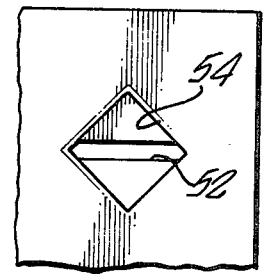

MAGNETIC TRANSDUCER SUSPENSION DEVICE

BACKGROUND

The present invention relates generally to magnetic disc recording systems and more particularly to a suspension device for supporting one or more magnetic transducers against a moving magnetic disc surface.

Reference is made to U.S. Pat. No. 4,245,267 entitled Suspension Device for Magnetic Transducers, in the name of Robert W. Herman, the applicant herein, and assigned to the same assignee as the present invention, the disclosure of which is hereby incorporated by reference.

Magnetic disc recording systems commonly utilize one or more magnetic transducers that are urged toward a rotating magnetic disc by suspension devices of various designs. The magnetic transducers ride against a fluid bearing formed between the magnetic heads and the rotating disc. Magnetic transducers of this type are often referred to as "flying" heads.

Various suspension devices are known which employ leaf springs to provide loading force which biases a magnetic transducer toward the surface of the magnetic disc. The leaf springs are generally affixed at one end to a suitable support and, at the other opposite end, contact or are secured to the magnetic transducer. Several suspension devices employing leaf springs are disclosed, for example, in U.S. Pat. Nos. 3,177,495, 3,512,253 and 3,573,768.

Such suspension devices, however, can in effect cause the loading force application point to vary as the loading force varies, causing undesirable rotational torques about the pitch axis of the transducer. For example, with the transducer rigidly affixed at or near the end of the leaf spring, the arc described by the leaf spring varies slightly as the loading applied to the transducer varies, thereby in effect shifting the loading force application point and thus causing the transducer pitch angle to vary. This loading may vary as a result of the magnetic transducer following surface imperfections in the rotating disc surface, often termed disc "runout", or as the load spring is adjusted to increase the loading force which biases the transducer toward the disc. This pitch variation can cause, among other difficulties, variations or loss of the signal being reproduced by the transducer or can cause the leading edge of the transducer to be rotated into the surface of the rotating disc, consequently causing a head crash with the ensuing loss of data and operating time.

As a further example, it is known to couple the magnetic transducer to the leaf spring by means of loosely fitting pins as is disclosed, for example, in U.S. Pat. No. 3,573,768. However, as the loading force applied by the leaf spring varies, the transducer tends to rock against the leaf spring contact surface, again varying the loading force application point and in turn causing the transducer pitch to undesirably vary.

In magnetic disc recording systems where the transducer is withdrawn from the surface of the disc when the disc is no longer rotated, it is further desirable to control the pitch attitude of the magnetic transducer as it nears the rotating disc surface during system start-up to thereby avoid damage to the transducer or the disc if an improper landing attitude is present. However, suspension devices employing leaf springs commonly provide no means for controlling this landing attitude and thus can cause the magnetic disc recording system to fail.

SUMMARY OF THE INVENTION

The suspension device of the present invention overcomes the limitations and drawbacks described above and includes in an exemplary embodiment a spring member and a transducer attachment clip engaged by the spring member. Pivot means are disposed between the spring member and the attachment clip for allowing the attachment clip to pivot with respect to an axis defined by the pivot means.

A suspension device in accordance with the present invention may further include a retraction member adapted to engage the attachment clip for applying retraction force to the attachment clip substantially opposite to a biasing force applied by the spring member. Indexing means between the retraction member and the attachment clip index the attachment clip with respect to the spring member and the retraction member when the retraction member engages the attachment clip. The spring member and the retraction member can be integrally formed.

Thus, a suspension device in accordance with the present invention advantageously applies biasing force through pivot means to precisely define the point at which the biasing force is applied to the magnetic transducer throughout a substantial range of magnetic transducer pitch angles. the pivot formed between the spring member and the attachment clip further allows the loading applied to the magnetic transducer to vary without rotating the transducer about the pitch axis. These advantages allow the transducer to better follow disc runout without substantial pitch variations. Moreover, the retraction member provides for transducer extension toward the disc surface while maintaining a predetermined transducer landing angle.

It is thus an object of the present invention to provide an improved magnetic transducer suspension device.

It is another object of the present invention to provide a magnetic transducer suspension device employing a pivoted transducer attachment clip.

It is a further object of the present invention to provide a magnetic transducer suspension device employing a transducer attachment clip pivoted to define a transducer pitch axis.

BRIEF DESCRIPTION OF THE DRAWINGS

These and other objects and advantages of the present invention will be apparent from a consideration of the entire specification in conjunction with the drawings in which:

FIG. 1 is a perspective view of a portion of a magnetic disc recording system employing a suspension device in accordance with the present invention;

FIG. 2 is an exploded view of a portion of the suspension device of FIG. 1;

FIG. 3 is a plan view of a spring body of the suspension device of FIG. 1 with the transducer attachment clip removed and the leaf spring partially cut away;

FIG. 4 is a plan view of a slot taken along line 4—4 of FIG. 2;

FIG. 5 is a plan view of a slot and recess taken along line 5—5 of FIG. 2;

FIG. 6 is an end view of a portion of the suspension device of FIG. 1 with the clip engaged by a retraction member (magnetic transducers not shown);

FIG. 7 is an end view of a portion of the suspension device of FIG. 1 with the clip not engaged by the retraction member (magnetic transducers not shown);

FIG. 8 is a side view of the system of FIG. 1 with the suspension device in the retracted position;

FIG. 9 is a side view of the system of FIG. 1 with the suspension device in an operating position.

DETAILED DESCRIPTION

With reference now to FIG. 1, a magnetic disc recording system 10 shown partially in FIG. 1 includes a rotating disc 12. A lower surface 14 of the disc 12 has a magnetically active coating upon which information may be stored. The magnetic disc recording system 10 further includes a member 16, part of suitable actuator means which can be similar to the actuator apparatus disclosed in the referenced U.S. Pat. No. 4,245,267, which may be supported by resilient supports, one of which is shown as a support 18 in FIG. 1. The member 16 can be displaced radially with respect to the disc 12 as shown by an arrow 20.

A suspension device 22 in accordance with the present invention is bonded to the member 16 such that the suspension device 22 is adjacent the lower surface 14 of the magnetic disc 12. The suspension device 22 carries a plurality of magnetic transducers the outer one of which is designated 24 that are urged by the suspension device 22 toward the lower surface 14 of the disc 12. The magnetic transducers 24 each include a plurality of magnetic cores 26 at the trailing edge thereof, the magnetic cores 26 in turn being energized by suitable means in order to record on to or reproduce from the magnetically active coating deposited upon the lower surface 14.

The magnetic disc 12 is supported by a suitable rotational means such as a motor and, when the rotational means is energized, the disc 12 rotates in a direction as shown by an arrow 28 of FIG. 1. With the magnetic disc 12 rotating, the suspension device 22 as positioned by the member 16 urges the magnetic transducers 24 toward the lower surface 14 of the magnetic disc 12. As is well known to those skilled in the art, the magnetic transducers 24 ride upon a fluid bearing produced between bearing surfaces of the magnetic transducers 24 and the lower surface 14. The loading force applied by the suspension device 22 to the magnetic transducers 24 is adjusted by positioning the member 16 in an operating position. As is described hereinbelow, the suspension device 22 pivotally supports the magnetic transducers 24 to more accurately apply the loading or biasing force thereto. When the magnetic disc recording system 10 is to be de-energized the rotation of the magnetic disc 12 ceases and the suspension device 22 retracts the magnetic transducers 24 from the lower surface 24.

With reference now to FIGS. 1-3, the suspension device 22 includes a spring body 30 formed from a single thickness of beryllium copper which can be approximately 0.005 of an inch thick. The spring body 30 is formed by a suitable process such as etching or stamping to include a leaf spring 32 and an associated retraction member 34 for each magnetic transducer 24 which is supported by the suspension device 22. In the embodiment of FIG. 1, a total of five similar adjacent leaf springs and the associated retraction members comprise the spring body 30, although other suitable quantities may be employed according to the number and design of the magnetic transducers 24. Each leaf spring 32 includes a first spring member 36 and a second spring member 38 which are joined at one end to a base area 39. A bridging member 40 (FIG. 2) joins the second ends of the first and second spring members 36 and 38. The first and second spring members 36 and 38 are disposed in a side-by-side relationship and are generally laterally parallel to provide the leaf spring 32 which may be relatively easily deflected toward or away from the disc lower surface 14 while substantially resisting lateral deflection radially with respect to the disc 12. The outer edges 41a and 41b of the first and second spring members 36 and 38 may be tapered slightly from the base area 39 toward the bridging member 40, thus raising the resonant frequency of the leaf spring 32 to thereby decrease the settling time of the magnetic transducers 24 in response to radial displacements of the member 16, the suspension device 22 and thus the transducers 24. Although the suspension device 22 of FIG. 1 includes the first and second spring members 36 and 38, it is to be understood that the leaf spring 32 can comprise a single leaf spring member according to, for example, the spring constant and loading force desired.

The retraction member 34 includes a base area 42 adapted to be bonded to the member 16 as for instance by welding. The retraction member 34 is generally rectangular and includes at its outer end a projection 44. The spring body 30 is bent at bend line 46 so that the retraction member 34 is generally parallel to the leaf spring pair 32 while leaving the bridging member 40 spaced slightly from the projection 44. Although the leaf spring pair 32 and the retraction member 34 have been described as being formed from the spring body 32 to help assure alignment and to decrease manufacturing costs and complexity, the leaf spring pair 32 and the retraction member 34 may be separately formed and suitably affixed to the member 16 while maintaining the required relationship between the leaf spring pair 32 and the retraction member 34.

As seen in FIGS. 2, 4 and 5, a first slot 50 and a second slot 52 are formed through the bridging member 40 adjacent to the outer end of the leaf spring 32. A square shaped recess 54 (FIG. 5) may be etched into the bridging member 40 about each slot 50 and 52. The recess 54 aids in defining pointed end bearing edges 56 (FIG. 4) within the slots 50 and 52.

A generally square opening 58 (FIGS. 2 and 3) is formed through the projection 44 and a slot 59 is formed through the projection 44 to extend a transverse diagonal of the square opening 58. The purpose of the first and second slots 50 and 52 and the square opening 58 and slot 59 will be made apparent through the description below.

Disposed about the bridging member 40 and the projection 44 is a transducer attachment clip 60 as best seen in FIG. 2. The attachment clip 60 may be formed from a single thickness of resilient material such as beryllium copper by, for example, etching or stamping, and is bent to form a pad 62 and a pivot body 64. The pad 62 is adapted to be bonded within a notch 66 (FIG. 1) of the transducer 24 to thereby affix the transducer 24 to the clip 60.

The pivot body 64 forms a frame comprising the body 64, upper member 71 and lower member 79 thereby defining a generally rectangular opening 67 within the frame 65. A first and a second pivot tab 68 and 70, respectively, project from the upper member 71 into the opening 67. Each pivot tab 68 and 70 includes perpendicular edge portions 72 and 74 separated by a projection 76 having a rounded end. The pivot body 64 further includes an index tab 78 projecting from the lower member 79 of the frame, which tab includes perpendicular edge portions 80 and 82 and a rounded projection 84 extending from the end of the index tab 78.

As seen in FIG. 2, the first and second pivot tabs 68 and 70 are received within the slots 50 and 52, respectively, of the bridging member 40 the edge portions 72 and 74 of each tab 68 and 70 riding against the edges defined by the pointed end bearing edges 56 of the slots 50 and 52. Thus, the clip 60 is carried by the leaf spring 32, providing a knife-like edge bearing between the leaf spring 32 and the clip 60, which defines an axis of rotation for the clip 60. Although two pivot tabs 68 and 70 and the corresponding slots 50 and 52 are shown for the suspension device 22, it is seen that each pivot tab and slot pair, as, for example, pivot tab 68 and slot 50, include two edge bearings between the edge portions 72 and 74 and the pointed end bearing edges 56. Thus, only one pivot tab and slot pair need be employed in a suspension device in accordance with the present invention, since the pivot tab and slot pair includes two edge bearings defining an axis of rotation for the clip 60.

With the suspension device 22 employed in the magnetic disc recording system 10 of FIG. 1 and initially with the system 10 de-energized, the retraction member 34 is displaced away from the lower surface 14 to a retracted position 86 (FIGS. 6 and 8). This retraction may be accomplished in the embodiment of FIG. 1 by, for example, displacing the member 16 away from the lower surface 14. As the displacement occurs, the projection 84 (FIG. 2) first passes through the square opening 58 to guide the indexing tab 78 into the slot 59 on the projection 44. Once the slot 59 comes to rest against the lower member 79, the retraction member 34 retracts the clip 60 and the transducer 24 from the lower surface 14. It is to be noted that the bend at the bend line 46 results in an angle between the retraction member 34 and the leaf spring 32 which causes the leaf spring 32 and the retraction member 34 to be resiliently compressed while within the opening 67, consequently retaining the clip 60 about the leaf spring 32 and the projection 44. More specifically, the slots 50 and 52 are urged against the edge portions 72 and 74 of the first and second pivot tabs 68 and 70. Thus in a retracted position, the clip 60 is positively held by the retraction member 34 and the leaf spring 32 to define a relatively precise predetermined landing angle for the magnetic transducer 24.

When the disc recording system 10 is energized, the magnetic disc 12 rotates and the retraction member 34 is displaced toward the lower surface 14. This displacement in the embodiment of FIG. 1 is accomplished by displacing the member 16 toward the lower surface 14 (FIG. 9). As the magnetic transducer 24 approaches the lower surface 14, the clip 60 as positioned by the retraction member 34 and the first and second spring members 36 and 38 maintains the magnetic transducer at a predetermined landing attitude or angle with respect to the lower surface 14 while at least a portion of the loading force is applied to the magnetic transducer 24 as the leaf spring 32 deflects.

Once the leaf spring 32 deflects sufficiently to apply a predetermined portion of the loading force to the transducer 24, the retraction member 34 is released from the indexing tab 78 as the displacement of the retraction member 34 and the member 16 continues to the operating position 88 (FIGS. 2, 7 and 9). This releases the clip 60 and thus the transducer 24 from the retraction member 34. The clip 60 then rides upon the pivots defined by the first and second pivot tabs 68 and 70 and the slots 50 and 52 to provide a pitch axis for the clip 60 and the transducer 24. It is to be noted that the axis along which the loading force is applied by the leaf spring 32 through the first and second pivot tabs 68 and 70 does not vary as the clip 60 and the transducer 64 pivots about the pitch axis. Moreover, it is seen that deflections within the first and second spring members 36 and 38 which can be caused by, for example, variations in the loading force due to disc runout, are not transferred through the pivots defined by the first and second pivot tabs 68 and 70 and the slots 50 and 52. Thus, these deflections do not cause corresponding pitch variations of the clip 60 and the transducer 24, eliminating the variations otherwise caused in the load force application point.

With the suspension device and the magnetic transducers 24 in the operating position 88 as shown in FIG. 9, the member 16 may be displaced radially with respect to the disc 12, thus laterally displacing the entire suspension device 22 and the magnetic transducers 24 radially with respect to the disc 12. In this way, various adjacent tracks of information on the lower surface 14 may be accessed.

Having thus described one embodiment of my invention in detail, it is to be understood that numerous equivalents and alterations which do not depart from the invention will be apparent to those skilled in the art, given the teachings herein. Thus, my invention is not to be limited to the above description but is to be of the full scope of the appended claims.

What is claimed is:

1. A suspension device for magnetic transducers comprising:
   a spring member;
   a transducer attachment clip engaged by said spring member and adapted to be affixed to said transducer, said spring member adapted to apply biasing force to said attachment clip; and
   pivot means disposed between said spring member and said attachment clip for allowing said attachment clip to pivot with respect to said spring member, said pivot means defining an axis of rotation for said attachment clip.

2. A suspension device for magnetic transducers comprising:
   a spring member,
   a transducer attachment clip engaged by said spring member and adapted to be affixed to said transducer, said spring member adapted to apply biasing force to said attachment clip,
   pivot means disposed between said spring member and said attachment clip for allowing said attachment clip to pivot with respect to said spring member, said pivot means defining an axis of rotation for said attachment clip, and
   retraction member means adapted to engage a portion of said clip for applying retraction force to said clip substantially opposite to said biasing force.

3. A suspension device as in claim 2 wherein said retraction member means includes indexing means between said retraction member means and said portion of said attachment clip for indexing said attachment clip with respect to said spring member and said retraction member means when said retraction member means and said portion of said attachment clip are engaged.

4. A suspension device for a magnetic transducer comprising:

a spring member;

a transducer attachment clip engaged by said spring member and adapted to be affixed to said transducer, said spring member adapted to apply a biasing force to said attachment clip;

pivot means disposed between said attachment clip and said spring member for allowing said attachment clip to pivot about an axis defined by said pivot means; and a retraction member adapted to engage said attachment clip to apply a retraction force to said attachment clip substantially opposite to said biasing force.

5. A suspension device as in claim 4 wherein said retraction member includes indexing means between said retraction member and said attachment clip for indexing said attachment clip with respect to said pivot means and said retraction member when said retraction member and said attachment clip are engaged.

6. A suspension device as in claim 4 wherein said spring member and said retraction member are integrally formed from a resilient material.

7. A suspension device as in claim 4 wherein said spring member comprises a first spring element and a second spring element substantially parallel to said first spring element.

8. A suspension device as in claim 4 wherein said pivot means includes first and second edge portions carried by said spring member and third and fourth edge portions carried by said attachment clip engaged with said first and second edge portions to form a pivot.

9. A suspension device as in claim 5 wherein said indexing means includes an index tab and an opening for receiving said index tab.

10. A suspension device as in claim 9 wherein said index tab is fixed to said attachment clip and said opening is formed through said retraction member and wherein said opening is of varying width to thereby guide said index tab into a predetermined position within said opening.

11. A suspension device for a magnetic transducer comprising:

a spring body including a first leaf spring, a second leaf spring disposed laterally parallel to said first leaf spring, and a retraction member generally parallel to and spaced from said leaf springs;

a transducer attachment clip engaged by end portions of said first and second spring members and adapted to be affixed to said transducer, said first and second spring members adapted to apply a biasing force to said attachment clip;

first pivot means disposed between said first spring member and said attachment clip and proximate said end portion of said first spring member for allowing said attachment clip to pivot with respect to said first spring member;

second pivot means disposed between said second spring member and said attachment clip and proximate said end portion of said second spring member for allowing said attachment clip to pivot with respect to said second spring member, said first and said second pivot means defining a pitch axis of rotation for said attachment clip;

said retraction member adapted to engage said attachment clip to apply a retraction force to said attachment clip substantially opposite to said biasing force; and said retraction member further including indexing means between said retraction member and said attachment clip for indexing said attachment clip with respect to said end portions and said retraction member when said retraction member and said attachment clip are engaged.

* * * * *